Aug. 1, 1933.  W. L. EVANS  1,920,685

ELECTRIC WATER HEATER

Filed Dec. 13, 1929

INVENTOR
W. L. Evans

BY Siggers + Adams
ATTORNEYS

Patented Aug. 1, 1933

1,920,685

UNITED STATES PATENT OFFICE 1,920,685

ELECTRIC WATER HEATER

William L. Evans, Washington, Ind.

Application December 13, 1929. Serial No. 413,692

14 Claims. (Cl. 219—38)

This invention relates to electric water heaters and, among other objects, aims to provide an improved, simple, efficient and economical water heater adapted to heat water very quickly.

Other aims and advantages of the invention will appear in the specification when considered in connection with the accompanying drawing, wherein.

Since electric power is now available at a reasonably low cost when used in commercial quantities, there is a great need for a simple, practicable, economical and efficient electric water heater for domestic storage tanks and heating systems. This invention therefore aims to provide an improved water heater of this type which can successfully compete with ordinary fuel heaters.

Figure 1:
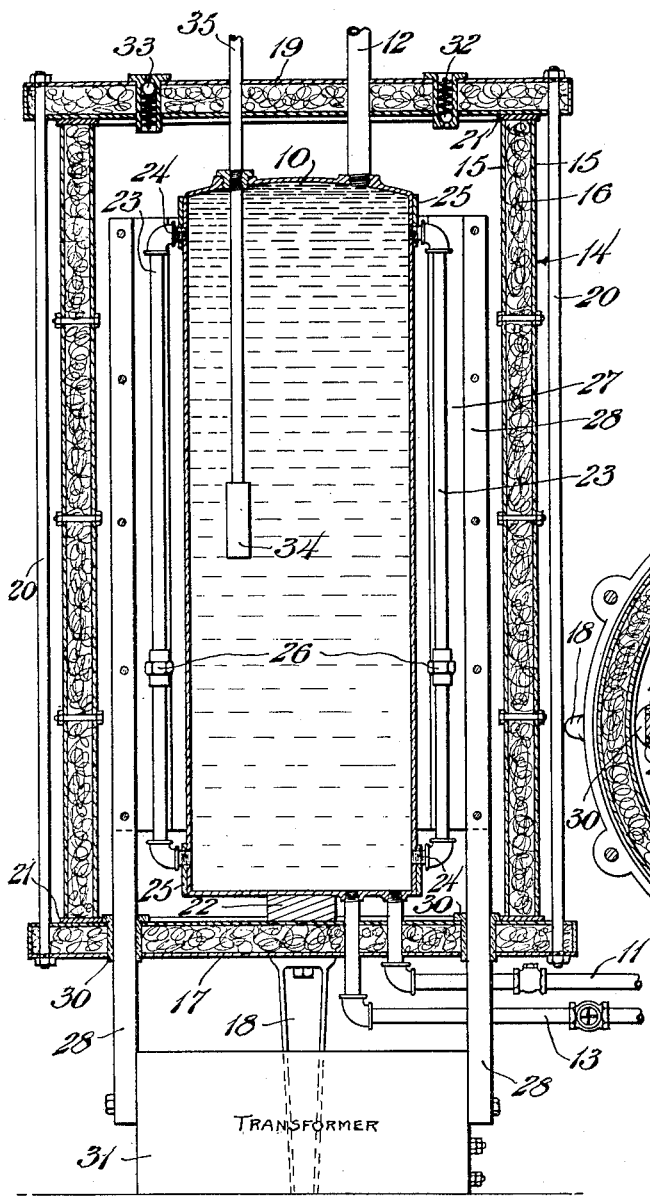
Fig. 1 is a vertical sectional view of a hot water heater embodying the invention.

Referring specifically to the drawing, the preferred embodiment of the heater is there shown as being applied to a domestic hot water storage tank 10 which may be of any desired capacity. It may be an ordinary, cylindrical, galvanized stand boiler or tank such as is now generally employed, being connected to a water supply pipe 11 to receive water under pressure and having a hot water outlet pipe 12 leading from the upper end. Also, a valved drain or clean-out pipe 13 is preferably connected to the lower end, as shown in Fig. 1.

Herein, the tank is shown as being mounted in a cylindrical, heat insulating casing 14 of larger diameter than the tank so as to provide an annular heating chamber surrounding the tank. While the casing may be made of any suitable material, it is shown as comprising spaced sheet metal cylinders 15 bolted together and having a packing 16 of non-conducting material between them. The lower end of the casing is mounted on an end wall or head 17 having legs 18 to support it above the floor and the upper end is closed by an end wall or head 19, both end walls being made of spaced sheet metal plates also, suitably packed with non-conducting material like the cylindrical casing. Both of the end walls are shown as being larger than the casing and are clamped against the ends of the casing by means of tie rods 20, annular gaskets 21 being used to make the casing air tight.

In this example, the water tank is shown as being supported above the lower end wall of the casing, a suitable supporting block 22 being employed for this purpose so as to permit heated air to come in contact with the bottom wall of the tank. As will be seen in Fig. 1, the tank is there shown as having a plurality of parallel, tubular water circulating elements 23 conveniently in the form of ordinary pipes connected to the tank by short radial nipples 24 at or adjacent to the upper and lower ends of the tank so as to heat and circulate the water from the bottom portion of the tank to the top and maintain a continuous circulation therethrough. When the tank is made of relatively thin sheet metal as shown, suitable reinforcing sheet metal bands 25 may be welded or otherwise secured to it where the nipples are threaded into it so as to afford sufficient thickness for the threads to hold. However, it is contemplated that the nipples or short conduits may be welded directly to the tank wall. For convenience in removing any of the tubular circulating elements, they are preferably provided with ordinary union couplings 26.

In accordance with this invention, there is shown an electrical resistance or heating unit composed of a pair of semi-cylindrical, corrugated sheet metal elements 27 arranged in the annular space between the tank and its cylindrical casing. Herein, the sheet metal heater elements extend substantially the entire height of the tank and the corrugations are V-shaped somewhat like those shown in my co-pending application, Ser. No. 413,691, filed Dec. 13, 1929, the idea being to enable the resistance elements to be made considerably longer than plain elements and also to distribute the heat substantially uniformly throughout their heights and areas. Furthermore, the corrugations practically eliminate any noisy vibrations of the elements when low voltage current is applied to them. In this example, the V-shaped corrugations are so arranged that the circulating tubes or elements 23 are arranged between them thereby exposing each tube to heat radiation and convection from both walls of a corrugation. If desired, other tubular circulating elements may be connected to the tank so as to extend between the outside corrugations also.

Figure 2:
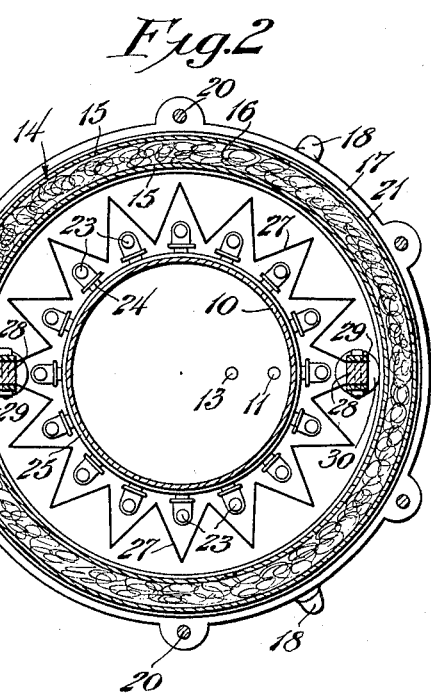
Fig. 2 is a transverse sectional view of the heater shown in Fig. 1.
Figure 3:
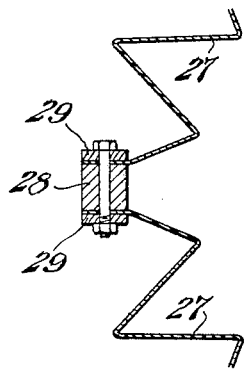
Fig. 3 is a fragmentary sectional view on an enlarged scale showing the preferred form of resistance element used in the heater.

Herein, the sheet metal heater elements 27 are both connected at their ends to a pair of diametrically opposed, vertical bus bars 28 within the casing and are conveniently secured thereto on opposite sides by means of suitable clamping plates 29 (see Fig. 2). These bus bars may be and preferably are similar to those shown and described in my aforesaid co-pending application. In this instance, they project downwardly through the lower wall or head 17 of the casing, suitable insulating sleeves 30 surrounding them in said wall to prevent electrical contact with the metal plates. These bus bars are connected to a source of relatively low voltage alternating current, such as a step-down transformer 31, shown in outline between the legs of the heater. The arrangement is such that the bus bars may be quickly disconnected from the transformer and slipped out of the top of the casing in order that the heater elements may be removed as a unit for repairs or replacement. That is to say, the whole heating unit may be inserted or removed without dismantling the casing or the heater, it being only necessary to take off the top wall of the casing.

To take care of the expansion of the air within the casing when the heat is applied, an air outlet in the form of a suitable spring check valve 32 is conveniently arranged in the end wall 19. To admit air into the casing as it cools and contracts, an inlet spring check valve 33 is also conveniently arranged in the end wall 19 of the casing.

In Fig. 1, there is shown a thermostat control element 34 of any suitable or conventional design arranged in the tank and connected to a suitable tube or pipe 35 which has provision for controlling an ordinary electric control switch (not shown) for the heater. Thus, the water in the tank may be kept at a substantially constant temperature and the current will be consumed according to the demand for hot water with practically no waste. However, it is to be understood that the operation of the heater may be manually controlled by ordinary hand switches. Moreover, the arrangement may be such that the switch is automatically operated upon opening any hot water spigot.

It will be observed that the illustrated heater unit presents a very large heating surface. It is designed to deliver sufficient heat to the circulating tubes and to the tank to raise the temperature of the water very quickly. The low voltage employed is such as to eliminate any danger of electric shocks or the fire hazard which usually presents a serious problem in connection with high temperature heating elements. Practically all of the heat delivered by the heater elements is confined within the casing and absorbed by the water in the tank and its circulating tubes, thus greatly increasing the efficiency and effecting a very great economy.

While the water heater herein shown and described is primarily adapted for domestic use, it will be understood that it may advantageously be employed for a wide variety of other uses. For example, it may be utilized instead of the ordinary fuel furnace to supply heat to the radiators of a hot water heating system, at the same time affording a supply of hot water for domestic use.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In an electric water heater of the class described wherein a tank is mounted within a casing spaced from the inner walls thereof to provide a heating chamber between the tank and casing, a corrugated sheet metal heating unit of considerable area within the chamber and surrounding the tank.

2. In an electric water heater having a substantially cylindrical heat insulating casing and a cylindrical tank within the casing spaced from the walls thereof to provide an annular heating chamber, a pair of corrugated sheet metal resistance elements within the heating chamber having their corrugations parallel with the axis of the tank; and bus bars connected to said resistance elements.

3. In an electric water heater having a substantially cylindrical heat insulating casing and a cylindrical tank within the casing spaced from the walls thereof to provide an annular heating chamber, a substantially cylindrical sheet metal heater unit of substantial length in the heating chamber; and a pair of bus bars extending through the casing and connected to said heater unit.

4. In an electric water heater having a substantially cylindrical heat insulating casing and a cylindrical tank within the casing spaced from the walls thereof to provide an annular heating chamber, a resistance unit comprising a pair of elongated, corrugated, sheet metal elements arranged in the heating chamber; and a pair of bus bars connected to both of said elements.

5. In an electric water heater having a heat insulating casing and a cylindrical tank within the casing and spaced from the inner walls thereof providing an annular heating chamber, an elongated sheet metal resistance unit within the chamber; and electrical conductors extending through the casing connected to said resistance unit, said conductors and unit being removable from the casing without disturbing the tank.

6. In an electric water heater having a casing and a tank within the casing, a plurality of water circulating tubes connected to the tank; and a corrugated sheet metal resistance unit in the casing arranged adjacent to the circulating tubes.

7. In an electric water heater having a casing and a tank within the casing, a plurality of water circulating tubes connected to the tank; and a pair of sheet metal resistance elements surrounding and spaced from the tank presenting corrugations to receive said tubes.

8. In an electric water heater having a cylindrical heat insulating casing and an upright cylindrical tank in the casing and spaced from the inner walls thereof to provide an annular heating chamber, a plurality of vertical circulation tubes connected to the tank and arranged in said chamber; a sheet metal heating element in the casing having vertical corrugations adjacent to the tubes.

9. In an electric water heater having a cylindrical heat insulating casing and an upright cylindrical tank in the casing and spaced from the inner walls thereof to provide an annular heating chamber, a plurality of vertical circulation tubes in said chamber having radially extending nipples connecting them to the upper and lower ends of the tank; and a sheet metal resistance element in the chamber having vertical, substantially V-shaped corrugations receiving said tubes.

10. In an electric heater having a cylindrical heat insulating casing and an upright cylindrical tank in the casing and spaced from the inner walls thereof to provide an annular heating chamber, a plurality of vertical circulation tubes in said chamber having radially extending nipples connecting them to the upper and lower ends of the tank; and a sheet metal resistance element removably mounted in the casing adjacent to the tubes.

11. In an electric water heater, a tank having a series of parallel circulating tubes; and a sheet metal resistance element surrounding the tank and having corrugations parallel with and partially surrounding the tubes.

12. In an electric water heater including an upright, cylindrical, heat insulating casing having end walls removably secured thereto and a cylindrical tank in the casing having spaced, vertical circulating tubes connected adjacent to the upper and lower ends of the tank, a corrugated sheet metal resistance unit arranged in the casing adjacent to the tubes; and a pair of bus bars extending through the casing and electrically connected to said unit, said unit being removable from the casing when the upper end wall of the casing is removed.

13. In electric water heaters of the class described, a resistance unit comprising a pair of generally semicylindrical, corrugated, sheet metal elements of substantial length adapted to enclose a cylindrical tank; a pair of parallel bus bars; and means connecting both sheet metal elements throughout their edges to each of said bus bars.

14. In electric water heaters of the class described, a resistance unit comprising a pair of generally semicylindrical, corrugated, sheet metal elements of substantial length adapted to enclose a cylindrical tank; a casing surrounding the heater; a pair of parallel bus bars extending through the casing and connected to both of said elements; and a source of current connected to the lower ends of the bus bars.

WILLIAM L. EVANS.